(12) United States Patent
Umezaki et al.

(10) Patent No.: US 10,195,769 B2
(45) Date of Patent: Feb. 5, 2019

(54) FORMING MOLD FOR GASKET AND METHOD OF MANUFACTURING THE GASKET

(71) Applicant: NOK CORPORATION, Tokyo (JP)

(72) Inventors: Nobuyuki Umezaki, Aso (JP); Hideto Nameki, Aso (JP)

(73) Assignee: NOK Corporation (JP)

( * ) Notice: Subject to any disclaimer, the term of this patent is extended or adjusted under 35 U.S.C. 154(b) by 41 days.

(21) Appl. No.: 15/100,814

(22) PCT Filed: Oct. 3, 2014

(86) PCT No.: PCT/JP2014/076494
§ 371 (c)(1),
(2) Date: Jun. 1, 2016

(87) PCT Pub. No.: WO2015/083428
PCT Pub. Date: Jun. 11, 2015

(65) Prior Publication Data
US 2016/0303772 A1    Oct. 20, 2016

(30) Foreign Application Priority Data

Dec. 6, 2013  (JP) ................................. 2013-252993

(51) Int. Cl.
*B29C 33/42*         (2006.01)
*F16J 15/328*        (2016.01)
(Continued)

(52) U.S. Cl.
CPC .............. *B29C 33/42* (2013.01); *B29C 45/26* (2013.01); *B29D 99/0053* (2013.01);
(Continued)

(58) Field of Classification Search
CPC ....... B29C 33/42; B29C 45/26; B29C 43/021; F16J 15/022; F16J 15/108; F16J 15/328;
(Continued)

(56) References Cited

U.S. PATENT DOCUMENTS 4,463,959 A * 8/1984 Usher ................. F01N 13/1805
                                                264/258
4,561,625 A * 12/1985 Weaver ............... B29C 33/0044
                                                249/160
(Continued)

FOREIGN PATENT DOCUMENTS

CN       101443173 A    5/2009
EP         2018947 A1    1/2009
(Continued)

OTHER PUBLICATIONS

Extended European Search Report for Application No. EP 14 86 7670 dated Nov. 30, 2016 (6 pages).

*Primary Examiner* — Nahida Sultana
(74) *Attorney, Agent, or Firm* — Harness, Dickey & Pierce, P.L.C.

(57) ABSTRACT

The object of the present invention is to provide a gasket forming mold with a structure in which curling of the reversing section of the gasket molding does not occur easily. To achieve said object, the forming mold for integrally forming an endless shaped gasket has forming grooves as cavities in the parting surfaces of the forming mold and the forming grooves have a reversing section in a part thereof. The reversing section has two linear portions and the ends of the two linear portions are connected by an arc-shaped curved section. The two linear portions are arranged at literally-symmetrical positions and are arranged so that a distance therebetween is enlarged little by little from one end toward the other. The ends where said distance (Continued)

is enlarged are connected by the circular arc-shaped curved section.

2 Claims, 3 Drawing Sheets

(51) Int. Cl.
    *B29D 99/00*     (2010.01)
    *F16J 15/10*     (2006.01)
    *F16J 15/02*     (2006.01)
    *B29C 45/26*     (2006.01)
    *B29L 31/26*     (2006.01)
    *B29L 31/00*     (2006.01)
    *B29C 43/02*     (2006.01)

(52) U.S. Cl.
    CPC ........... *F16J 15/022* (2013.01); *F16J 15/108* (2013.01); *F16J 15/328* (2013.01); *B29C 43/021* (2013.01); *B29L 2031/265* (2013.01); *B29L 2031/711* (2013.01)

(58) Field of Classification Search
    CPC ........... B29D 99/0053; B29L 2031/711; B29L 2031/265
    USPC ............ 264/161, 328.2, 299, 264, 494, 258; 156/245; 277/531, 641, 639, 590, 627, 277/608
    See application file for complete search history.

(56) References Cited

U.S. PATENT DOCUMENTS

| | | | | |
|---|---|---|---|---|
| 5,137,674 A | * | 8/1992 | Braconier | B29C 45/14 264/160 |
| 2003/0231983 A1 | * | 12/2003 | Schleifer | B01L 3/5025 422/50 |
| 2009/0174153 A1 | * | 7/2009 | Asai | B29C 45/2616 277/590 |
| 2012/0187638 A1 | * | 7/2012 | Bauer | B29C 45/14467 277/639 |
| 2012/0280494 A1 | * | 11/2012 | Vandal | F16L 17/04 285/337 |
| 2012/0313330 A1 | * | 12/2012 | Scalf | F25D 23/087 277/631 |
| 2013/0049308 A1 | * | 2/2013 | Raillard | F16J 15/022 277/640 |
| 2013/0154150 A1 | * | 6/2013 | Shimazoe | B29C 45/14344 264/161 |
| 2015/0260317 A1 | * | 9/2015 | Yamamoto | F16J 15/122 277/609 |
| 2016/0052182 A1 | * | 2/2016 | Koga | B29C 45/14336 264/257 |

FOREIGN PATENT DOCUMENTS

| | | |
|---|---|---|
| GB | 1 266 866 A | 3/1972 |
| JP | H11125336 A | 5/1999 |
| JP | 2007301874 A | 11/2007 |
| JP | 2015-100963 A | 6/2015 |

* cited by examiner

*PRIOR ART*

FORMING MOLD FOR GASKET AND METHOD OF MANUFACTURING THE GASKET

CROSS-REFERENCE TO RELATED APPLICATIONS

This application is a U.S. National Phase Application under 35 U.S.C. 371 of International Application No. PCT/JP2014/076494, filed on Oct. 3, 2014 and published in Japanese as WO2015/083428 on Jun. 11, 2015. This application claims priority to Japanese Patent Application No. 2013-252993, filed on Dec. 6, 2013. The entire disclosures of the above applications are incorporated herein by reference.

BACKGROUND OF THE INVENTION

Field of the Invention

The present invention relates to a forming mold for a gasket and a method of manufacturing the gasket according to the sealing technology.

Description of the Conventional Art

As one kind of an endless-shaped gasket, there has been conventionally known widely an O-ring which is formed into a planar circular ring shape, and the O-ring is formed into various sizes in correspondence to a product specification.

In the case of forming a large-diameter O-ring in which a diameter goes beyond, for example, 1600 mm, a size of a used forming mold comes to 2000 mm in one side if it is intended to integrally form the O-ring while keeping a product shape as it is, so that a manufacturing facility is extremely enlarged in size.

Further, there has been developed a method of carrying out a joining work after divisionally forming one O-ring in a circumferential direction, however, according to this method, it takes a lot of labor hour and time for manufacturing, and concavity and convexity is generated in a joint section of the formed product, so that a lack of strength tends to be generated.

Taking the above problem into consideration, the applicant of the present invention has previously proposed a forming mold 51 shown in FIG. 3 (refer to Japanese Unexamined Patent Publication No. 2007-301874).

More specifically, the forming mold 51 is a forming mold for integrally forming an endless-shaped gasket, and has a plurality of forming sections 52 in which two forming grooves 53 and 54 aligned in parallel so as to be adjacent to each other are arranged spirally, each of the spiral forming grooves 53 and 54 has a reversing section 55 in an inner end portion thereof and is provided with a structure obtained by connecting outer end portions thereof to each other in series. According to the forming mold 51, it is possible to make a planar shape of the forming mold for integrally forming the large-diameter gasket as small as possible, thereby downsizing a manufacturing facility. Further, it is possible to suppress generation of any lack of strength in the joint section without a lot of labor hour and time for manufacturing since the gasket is integrally formed.

However, according to the forming mold 51, there may be generated in the gasket which is the formed product a curling shape (a curling shape due to forming, that is, a meandering shape left partially on a circumference without forming the prescribed product shape of the gasket after taking the gasket out of the mold), in an S-shaped reversing section 55 which is positioned in a center portion of the spiral shape. There is a possibility that deformation is left in a part of the gasket after a correcting treatment of the curling shape.

SUMMARY OF THE INVENTION

Problem to be Solved by the Invention

The present invention is made by taking the above points into consideration, and an object of the present invention is to provide a forming mold for a gasket having a structure in which a curling shape is hard to be generated in a reversing section of the gasket which is a formed product while applying a further improvement to the above prior art, or a method of manufacturing the gasket.

Means for Solving the Problem

In order to achieve the above object, a forming mold according to a first aspect of the present invention is a forming mold for integrally forming an endless-shaped gasket, wherein a forming groove serving as a cavity space is provided in a parting surface of the forming mold, the forming groove has a reversing section in a part thereof, the reversing section has two linear sections, and end portions of the two linear sections are connected by a circular arc-shaped curved section.

Further, a forming mold according to a second aspect of the present invention is the forming mold described in the first aspect mentioned above, wherein the two linear sections are arranged at linearly symmetrical positions and are arranged so that a distance between the linear sections is enlarged little by little from one end toward the other end, and the end portions having the enlarged distance are connected by the circular arc-shaped curved section.

Further, a manufacturing method according to a third aspect of the present invention is a method of forming a gasket by using the forming mold described in the first or second aspect mentioned above.

As a condition that the curling shape is hard to be generated in the gasket which is the formed product, it can be thought that the linear section is provided in the reserving section having a changed curvature in a center portion partially, in addition to a structure in which a radius of curvature of each of the curved sections of the forming groove provided in the parting surface of the forming mold is made as large as possible. More specifically, it can be thought that two linear sections are provided in the reversing section, and the end portions of these two linear sections are connected by the circular arc-shaped curved section. The reversing section is a section that the forming groove turns around at a greater angle than 90 degrees as its name suggests. Since a curling shape generated in the linear section is small in the case that the linear section is provided in a part of the reversing section, it is possible to suppress a magnitude of the curling shape as a total of the reversing section. In the case that the reversing section is formed into an S-shaped form, an oppositely oriented circular arc may be connected to a lower side of a circular arc in an upper half of the S-shaped form. As a result, the curling shape tends to be generated in the reversing section. However, since the linear section is connected to the lower side of the circular arc in the present invention, the curling shape is hard to be generated in the reversing section.

Two linear sections may be arranged in parallel to each other, however, may be arranged in such a manner that the distance between two linear sections is enlarged little by little from one end toward the other end. In this case, the radius of curvature of the curved section can be set larger by connecting the end portions in the side having the enlarged distance to each other by the circular arc-shaped curved section.

Effect of the Invention

The present invention achieves the following effects.

More specifically, according to the present invention, it is possible to make the curling shape generated in the reversing section small by arranging two linear sections in the reversing section and connecting the end portions of these two linear sections by the curved section as described above. Therefore, the curling shape is hard to be generated in the reversing section, and it is possible to suppress deformation of the gasket due to the curling shape generation. Further, since the radius of curvature of the curved section can be set larger by arranging two linear sections in non-parallel and arranging the curved section in the end portion having the larger distance, it is possible to make the curling shape generated in the reversing section further smaller.

DETAILED DESCRIPTION OF PREFERRED EMBODIMENT

Next, a description will be given of an embodiment according to the present invention with reference to an accompanying drawings.

Figure 1:
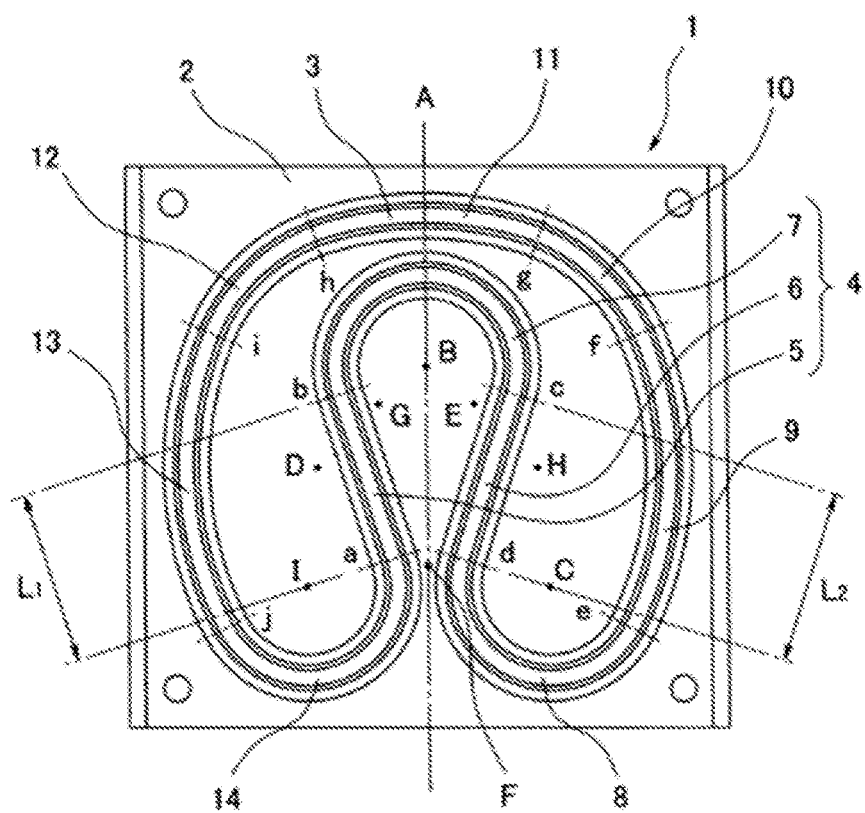
FIG. 1 is a plan view of a parting surface in a forming mold according to an embodiment of the present invention.

FIG. 1 shows a plane of a parting surface 2 in a state in which a forming mold 1 according to an embodiment of the present invention is opened.

The forming mold 1 according to the embodiment is structured such as to integrally mold a large-diameter O-ring which is formed into a planar circular ring shape as an endless-shaped gasket, is provided on a plane of a parting surface 2 thereof with one endless-shaped forming grove 3 as a product cavity space, and is provided in a part of the forming groove 3 with a reversing section 4. The reversing section 4 has two linear sections 5 and 6, and end portions b and c of these two linear sections 5 and 6 are smoothly connected to each other by a circular arc-shaped curved section 7.

Further, two linear sections 5 and 6 are arranged at linearly symmetrical positions around a line (a center line) A, and are arranged in a V-shaped manner so that a distance therebetween is enlarged little by little from one end (a lower end in the drawing) toward the other end (an upper end in the drawing), and the end portions b and c having the enlarged distance are connected smoothly to each other by the circular arc-shaped curved section 7.

Further, the endless-shaped forming groove 3 is constructed by a combination of sections listed up below, as a whole, and each of the sections is smoothly connected.

Linear section 5 between a and b in a left side on the drawing

Circular arc-shaped curved section 7 between b and c around a point B

Linear section 6 between c and d in a right side on the drawing

Circular arc-shaped curved section 8 between d and e around a point C

Circular arc-shaped curved section 9 between e and f around a point D

Circular arc-shaped curved section 10 between f and g around a point E

Circular arc-shaped curved section 11 between g and h around a point F

Circular arc-shaped curved section 12 between h and i around a point G

Circular arc-shaped curved section 13 between i and j around a point H

Circular arc-shaped curved section 14 between j and a around a point I

The points B and F are arranged on the line A. The points C and I, the points D and H and the points E and G are respectively arranged at linearly symmetrical positions around the line A. The curved sections 8 and 14, the curved sections 9 and 13 and the curved sections 10 and 12 are respectively set so that radius of curvature are equal. Therefore, the endless-shaped forming groove 3 is formed into a linearly symmetrical shape around the line A as a whole thereof.

Figure 2:
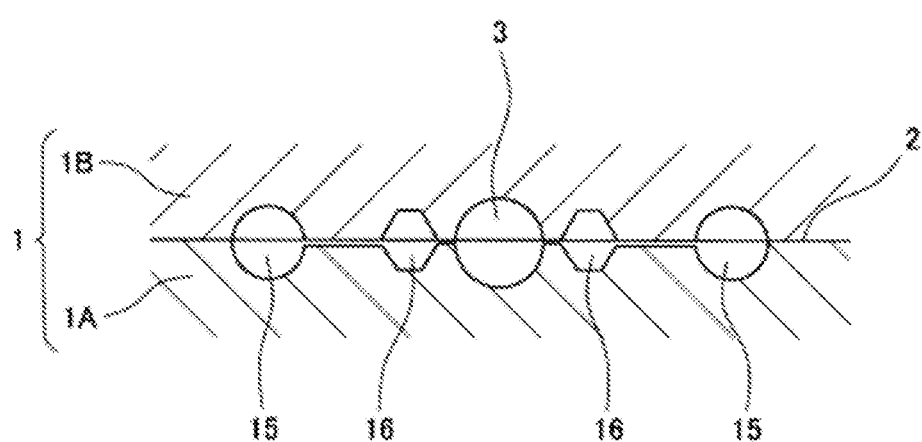
FIG. 2 is an enlarged cross sectional view of a substantial part of the forming mold.

Further, as shown by a cross section in FIG. 2, a burr groove 15 and a biting groove 16 are provided in each of an outer peripheral side and an inner peripheral side of the forming groove 3. Further, since the forming mold 1 is constructed by a combination of a pair of divided molds 1A and 1B, the forming groove 3, the burr groove 15 and the biting groove 16 are provided in each of the parting surfaces 2 of the divided molds 1A and 1B.

In the forming mold 1 having the structure mentioned above, two linear sections 5 and 6 are provided in the reversing section 4 and the end portions b and c of these two linear sections 5 and 6 are connected to each other by the circular arc-shaped curved section 7 as mentioned above. Therefore, a curling shape (a curling shape due to forming) is hard to be generated in the reverse section of the formed product which is formed by the combination of these linear sections 5 and 6 and the curved section 7 in comparison with the conventional S-shaped structure.

Further, two linear sections 5 and 6 are arranged at the linearly symmetrical positions around the line A, and are arranged in the V-shaped manner so that the distance therebetween is enlarged little by little from one end toward the other end, and the end portions b and c having the enlarged distance are connected to each other by the circular arc-shaped curved section 7. As a result, the radius of curvature of the curved section 7 is prescribed by the distance between b and c (the distance between the other ends of the linear sections 5 and 6) in place of the distance between a and d (the distance between one ends of the linear sections 5 and 6. Therefore, the radius of curvature of the curved section 7 is set larger than the case that the radius of curvature is prescribed by the distance between a and d. Accordingly, since the radius of curvature of the curved section 7 is greater as mentioned above, the curling shape is hard to be generated in the reversing section of the formed product.

In order to sufficiently obtain the effects mentioned above, it is preferable to set lengths L1 and L2 of the linear sections 5 and 6 to be at least equal to or more than 30 mm, and further preferably equal to or more than 60 mm, and set the radius of curvature of the curved section 7 and the radius of curvature of the other curved sections 8 to 14 to be equal to or more than R70.

Figure 3:
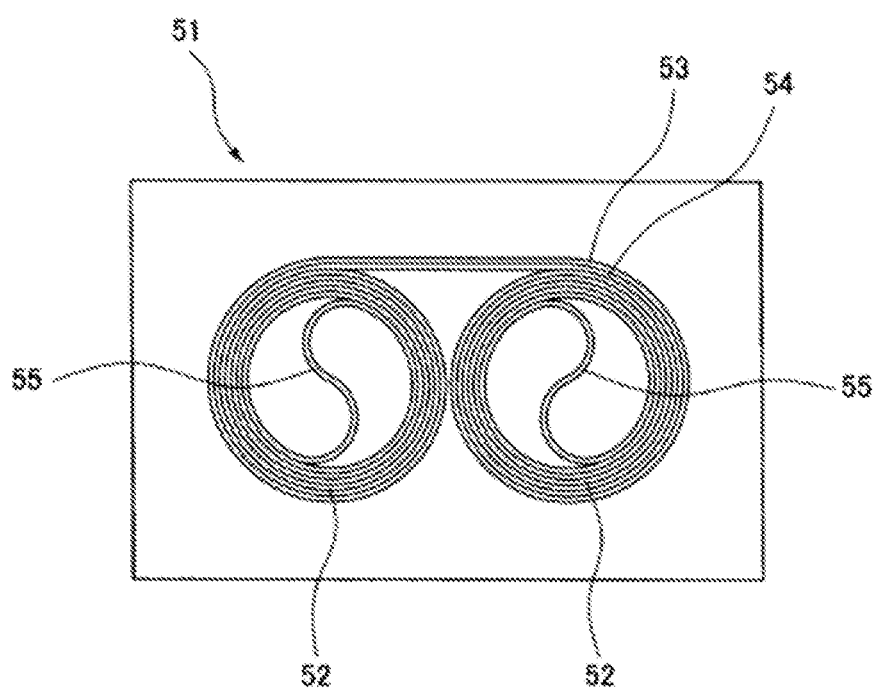
FIG. 3 is a plan view of a parting surface in a forming mold according to the prior art.

A manufacturing method according to the present invention integrally mold a large-diameter O-ring which is formed into a planar circular ring shape by using the forming mold 1. The O-ring is generally formed by a rubber material. The O-ring is used, for example, in a semiconductor manufacturing device. On the basis of the combination of the linear sections 5 and 6 and the curved section 7 in the embodiment mentioned above, the reversing section 4 may be arranged in a center portion of the spiral forming groove as shown in FIG. 3.

What is claimed is:

1. A forming mold for integrally forming an endless-shaped gasket, the forming mold comprising:
    a forming groove that is configured as a cavity space provided in a parting surface of the forming mold,
        wherein the forming groove has a reversing section in a part thereof,
        wherein the reversing section has two straight sections, and end portions of the two straight sections are connected by a circular arc-shaped curved section, and
        wherein the two straight sections are arranged at linearly symmetrical positions and are arranged so that a distance between the straight sections is enlarged little by little from one end toward the other end, and the end portions having the enlarged distance are connected by the circular arc-shaped curved section.

2. A method of manufacturing an endless-shaped gasket, comprising:
    providing a forming mold that includes:
    a forming groove that is configured as a cavity space provided in a parting surface of the forming mold,
        wherein the forming groove has a reversing section in a part thereof,
        wherein the reversing section has two straight sections, and end portions of the two straight sections are connected by a circular arc-shaped curved section, and
        wherein the two straight sections are arranged at linearly symmetrical positions and are arranged so that a distance between the straight sections is enlarged little by little from one end toward the other end, and the end portions having the enlarged distance are connected by the circular arc-shaped curved section; and
    forming the endless-shaped gasket by depositing a rubber material into the forming mold.

* * * * *